United States Patent [19]

Creasey et al.

[11] 4,049,873

[45] Sept. 20, 1977

[54] SURFACE TREATING COMPOSITIONS

[75] Inventors: Norman Geoffrey Creasey; Leslie Clark Pike, both of Blackley, England

[73] Assignee: Imperial Chemical Industries Limited, London, England

[21] Appl. No.: 644,199

[22] Filed: Dec. 24, 1975

[30] Foreign Application Priority Data

Jan. 28, 1975 United Kingdom ............... 3592/75
July 23, 1975 United Kingdom ............. 30843/75

[51] Int. Cl.$^2$ .................... B32B 9/04; C08G 77/04; C08L 43/04
[52] U.S. Cl. ............... 428/447; 106/287 SB; 260/46.5 G; 260/46.5 H; 260/46.5 UA; 260/825
[58] Field of Search ......... 428/447; 260/825, 46.5 G, 260/46.5 H, 46.5 UA; 106/287 SB

[56] References Cited

U.S. PATENT DOCUMENTS

| | | | |
|---|---|---|---|
| 3,109,826 | 11/1963 | Smith | 260/46.5 G |
| 3,110,689 | 12/1963 | Smith | 260/46.5 G |
| 3,308,080 | 3/1967 | Haenni | 428/447 |
| 3,440,206 | 4/1969 | Pande et al. | 260/46.5 G |
| 3,455,878 | 7/1969 | Quaal | 260/825 |
| 3,527,659 | 9/1970 | Keil | 428/447 |
| 3,541,127 | 11/1970 | Beattie et al. | 260/46.5 H |
| 3,829,529 | 8/1974 | Lengnick | 260/46.5 G |
| 3,900,617 | 8/1975 | Grenoble | 260/46.5 UA |
| 3,941,856 | 3/1976 | Creasey et al. | 260/46.5 H |

FOREIGN PATENT DOCUMENTS

| | | |
|---|---|---|
| 1,240,520 | 7/1971 | United Kingdom |
| 1,111,156 | 4/1968 | United Kingdom |
| 848,312 | 9/1960 | United Kingdom |

*Primary Examiner*—George F. Lesmes
*Assistant Examiner*—William R. Dixon, Jr.
*Attorney, Agent, or Firm*—Cushman, Darby & Cushman

[57] ABSTRACT

Organopolysiloxane release composition based on curable linear organopolysiloxanes modified by the incorporation of a copolymer containing a proportion of Me($R^1$Q)SiO groups in which at least one $R^1$ group has at least 6 carbon atoms and Q is O or S, with or without a proportion of MeRSiO groups in which at least one R group has at least 4 carbon atoms, and substrates treated therewith.

10 Claims, No Drawings

SURFACE TREATING COMPOSITIONS

This invention relates to organopolysiloxane compositions suitable for conferring release properties on substrates and to a process for rendering substrates abhesive.

Organopolysiloxane compositions suitable for conferring release properties on substrates are well known and have been used widely. Among suitable well known compositions commonly available are those based on a diorganopolysiloxane capable of being cured to an elastomer in conjunction with one or more cross-linking agents and a curing catalyst, an organometallic compound or an amine. These compositions have been widely used for coating substrates such as various kinds of paper, plastics films, wood, metal, glass and ceramics. While satisfactory in many cases it has, however, been found that they do not give a sufficiently low release when used with aggressive adhesives, i.e., adhesives having an adhesion greater than 1000g. per inch. We have now found, surprisingly, that the release properties conferred by such compositions can be improved by the incorporation therein of a proportion of certain copolymers.

According to the present invention an organopolysiloxane composition suitable for conferring release properties on substrates comprises 100 parts by weight of a diorganopolysiloxane in the form of a curable release composition, as hereinafter defined, and 0.1 to 50 parts by weight of a copolymer essentially of the average general formula:

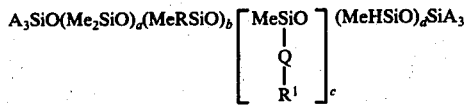

where A is selected from the group R, $R^1Q$, alkenyl and hydroxy groups and hydrogen, Q is oxygen or sulphur, R is selected from (a) alkyl, aryl, alkaryl, aralkyl and cycloalkyl groups, (b) groups -$R^2QR^3$ where $R^2$ is a divalent organic group having at least 2 carbon atoms and is joined to silicon by a C-Si linkage and $R^3$ is a monovalent hydrocarbon group and (c) hydrocarbonoxy groups joined to silicon by a C-Si linkage, $R^1$ is a hydrocarbon or hydrocarbonoxy group $a$ and $d$, which will not normally be the same, are 0 or numbers not greater than 950, $b$ is 0 or a number not greater than 999 and $c$ is a number from 1 to 1000, $a + b + c + d$ is not less than 20 and not greater than 1000, $(b + c)/(a + b + c + d)$ is not less than 0.05, at least one of the groups $R^1$ having not less than six carbon atoms when $b$ is 0 and, when $b$ is not 0, at least one of the groups R having not less than four carbon atoms and/or at least one of the groups $R^1$ having not less than six carbon atoms, the proportion of said copolymers also being such that the ratio of $R^1Q$ groups in which $R^1$ has at least six carbon atoms plus R groups having at least four carbon atoms to total silicon atoms in the composition is not less than 1:2000.

By the phrase "a diorganopolysiloxane in the form of a curable release composition," as used herein, we mean a composition consisting essentially of a linear diorganopolysiloxane capable of being cured to an elastomer and such cross-linking and/or curing agent as may be necessary. Curable organopolysiloxane release compositions suitable for use in the compositions of our invention are well known and are of several types. These may be based on a linear polysiloxane containing silicon-bonded hydroxyl groups in which case a cross-linking agent such as a polysiloxane containing silicon-bonded hydrogen, an alkyl polysilicate, a trialkoxyorganosilane or partial hydrolysate thereof, or an organotriacyloxysilane is used together with a catalyst which may be, for example, one of the many well known tin compounds used for such purposes of which there is a large variety available. Alternatively they may be based on a linear polysiloxane containing silicon-bonded vinyl groups with a cross-linking agent such as a polysiloxane containing silicon-bonded hydrogen and a catalyst such as a platinum compound or without any cross-linking agent but with a peroxide type catalyst. These compositions may, of course, also contain known additives added to give modification of properties, for example, such as improving abrasion resistance or increasing the speed of cure. Curable release compositions of these types are described in, for example, British patent specifications Nos. 804,198, 848,312, 852,717, 1,111,156, 1,116,989, 1,152,251 and 1,240,520 and U.S. Pat. Spec. No. 2,940,875.

In the co-polymer the group R may be, for example, an ethyl, propyl, butyl, octyl, decyl, tetradecyl, hexadecyl, cyclohexyl, phenylethyl, γ-phenoxypropyl, γ-octoxypropyl, β-hexadecoxyethyl, γ-poly(isopropoxy)-propyl, β-carbomethoxypropyl or β-carbononoxypropyl group.

The group $R^1$ may be a hydrocarbon group such as an alkyl, aryl, aralkyl, alkaryl or cycloalkyl group or a hydrocarbonoxy group. Suitable groups include, for example, methyl, ethyl, propyl, butyl, pentyl, hexyl, octyl, decyl, undecyl, tetradecyl, hexadecyl, octadecyl, cyclohexyl, benzyl and poly(isopropoxy) groups.

It is in general preferred that the groups R and $R^1$ each contain not more than 30 carbon atoms. It is also preferred that all of the groups R and $R^1$ contain at least 4 and at least 6 carbon atoms respectively. It is further preferred that at least one of the groups R or $R^1$ are alkyl groups containing at least 8 carbon atoms and it is most preferred that all of the groups R and $R^1$ are such. It is also preferred that the group Q be oxygen.

Suitable groups A include the groups described as suitable R and $R^1Q$ groups, vinyl, allyl and hydroxy groups and hydrogen. Methyl and vinyl groups and hydrogen are in general preferred giving terminal groups such as $SiMe_3$, $SiMe_2Vi$ and $SiMe_2OH$. Because of its availability the terminal group $SiMe_3$ is most preferred.

Whilst in the copolymer the sum of $a + b + c + d$ may be as stated it is in general preferred that it be not less than 40. It is also preferred that the ratio $(b + c)/(a + b + c + d)$ be from 0.1:1 to 0.9:1 and it is further preferred that it be from 0.2:1 to 0.7:1. It is also preferred that the ratio $a/(a + b + c + d)$ be not less than 0.1:1 and it is further preferred that it be not less than 0.3:1. It is also preferred that the ratio $d/(a + b + c + d)$ be not greater than 0.3:1 and it is further preferred that it be not greater than 0.05:1.

The copolymers which are essentially of the average formula given hereinbefore, may also contain small amounts of branching. They may be prepared in well known manner, for example, by reaction of a suitable polysiloxane containing silicon-bonded hydrogen atoms with a suitable alcohol or mercaptan in presence of a condensation catalyst, or by cohydrolysis of appropriate silanes.

While the copolymer may be used in amount from 0.1 to 50 parts by weight per 100 parts by weight of the curable diorganopolysiloxane, amounts from 0.5 to 15 parts by weight are normally adequate and are in many cases preferred. The improvement in release value obtained increases with increase of copolymer content to a maximum beyond which further increase of copolymer content gives no additional decrease in release value. The quantity of copolymer required to give any specific effect also increases with increase in the absorbency of the substrate being coated. Thus in the case of an absorbent substrate such as a clay coated paper it may well be desirable or necessary to employ 15 to 20 parts by weight of curable diorganopolysiloxane. It is also in general preferred that the proportion of the copolymer used should be such that the ratio of $R^1$ groups having at least 6 carbon atoms plus R groups having at least 4 carbon atoms to total silicon atoms present in the composition should not be less than 1:1000.

In addition to the essential components our compositions may, of course, also contain other components commonly used in such release systems, for example, abrasion resistant additives, bath stabilisers and the like.

The compositions of our invention are in general used without solvent or in solution in a solvent but may, if desired, be used in the form of aqueous dispersions or emulsions. If a solvent is used it may be any one of the commercially available inert solvents and is normally used in the amount required to give the desired viscosity of solution suitable for the particular manner of application to any substrate to be treated. Suitable solvents include aliphatic and aromatic hydrocarbons, chlorinated hydrocarbons, ethers, ketones and esters, for example, such as hexane, heptane, mineral spirits, toluene, xylene, trichloroethylene, perchloroethylene, tetrahydrofuran, methyl ethyl ketone and ethyl acetate.

The composition of our invention may be cured in well known manner, that chosen in any specific case being dependent on the nature of the release composition used. In general compositions are preferred which cure in less than 2 minutes at a temperature of 70° to 200° C when in film form on a substrate. The temperature selected for curing in any specific case will, of course, be governed by the application for which the composition is being used.

Our compositions can be cured to non-migratory films having greatly improved release properties by applying to a substrate and thereafter exposing to a temperature of, for example, 150° C or higher for a few seconds or to a lower temperature for a longer period, for example, some 15 seconds at 120° C or about 1 minute at 70° C. The substrate to which the composition is applied may be any solid surface on which it is desired to confer release properties when used with aggressive adhesives. Suitable substrates include glass, stone and ceramics, plastics including polyolefin and polyester films and fabrics such as polypropylene and polyethylene terephthalate films and fabrics, cellulosic materials including films and fabrics such as wood, cotton and paper, including glassine, parchment, kraft and tissue and metal foils such as aluminium foil. The compositions are, however, particularly valuable for use in processes such as paper treating which can be carried out continuously at high speeds, for example, speeds of up to 500 ft/minute can be used where it is possible to give a dwell time of some 15-30 seconds in a heating zone at 110°-120° C.

Our invention is further illustrated by the following examples in which all parts are by weight.

EXAMPLE 1

Two coating solutions were prepared, each consisting of 100 parts of a linear hydroxyl-ended dimethylpolysiloxane of viscosity $10^7$ cP at 25° C, 6 parts of a linear trimethylsilyl-ended methylhydrogenpolysiloxane of viscosity 20 cP at 25° C and of Me:Si ratio 1.08:1, 8 parts of dibutyltin diacetate and 1 parts of acetic acid in 1200 parts of toluene. To one of these solutions was added 5 parts of a copolymer (A) of average formula:

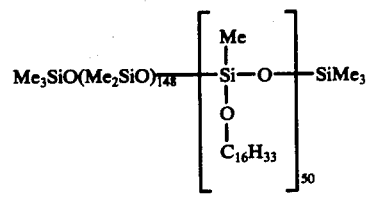

These solutions were then coated on to vegetable parchment paper to give silicone coatings of about 0.8g/m² and the coatings cured in a forced draught air oven at 120° C for 20 seconds. They were then coated with a solvent solution of an aggressive pressure sensitive adhesive, again placed in an air oven to remove the adhesive solvent, and finally label paper was applied to the solvent-free adhesive surface to complete the laminate. Samples of each laminate were stored under a pressure of ¼ psi for 20 hours at 20° C, then the force required to separate an inch-wide strip at speeds of 12, 400, 800 and 1500 inches per minute were measured. The separated adhesive coated paper strips were applied to a clean polyethylene terephthalate film surface, rolled twelve times with a 30 lb. roller, and the release force, called "subsequent adhesion," measured. The observed results are given below:

| Parts Copolymer | Peel force (g/inch) at stripping speeds (inches/minute) | | | | Subsequent Release (g/inch) |
| --- | --- | --- | --- | --- | --- |
| | 12 | 400 | 800 | 1500 | |
| — | 65 | 150 | 194 | 240 | 1700 |
| 5 | 37 | 119 | 152 | 206 | 1600 |

(The adhesive used was an aggressive SBR adhesive having a normal peel strength of 1500-1700g/inch)

EXAMPLE 2

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of an aminoalkoxypolysiloxane of average formula $Me_3SiO[MeSi(OCH_2CH_2NH_2)O]_{50}SiMe_3$ in 1200 parts of toluene.

To one of these solutions was added 5 parts of copolymer (A). The solutions thus obtained were coated on to parchment paper, cured, laminated and tested in the manner described in Example 1. The results obtained are given below:

| Parts Copolymer added | Peel force (g/inch) at stripping speeds (inches/minute) | | | |
|---|---|---|---|---|
| | 12 | 400 | 800 | 1500 |
| 0 | 38 | 96 | 159 | 200 |
| 5 | 9 | 54 | 92 | 127 |

| Copolymer added | Peel force (g/inch) at stripping speeds (inches/minute) | | | |
|---|---|---|---|---|
| | 12 | 400 | 800 | 1500 |
| — | 39 | 112 | 177 | 203 |
| (B) | 21 | 80 | 135 | 161 |
| (C) | 14 | 81 | 136 | 144 |

EXAMPLE 3

Two coating solutions were prepared each consisting of 100 parts of the hydroxyl-ended dimethylpolysiloxane used in Example 1, 6 parts of the methylhydrogenpolysiloxane used in Example 1, 8 parts of 1,3-diacetyl-1,1,3,3-tetrabutyldistannoxane and 9 parts of an aminoalkoxypolysiloxane of average formula $Me_3SiO[MeSi(OCH_2CH_2NMe_2)O]_{50}SiMe_3$ in 1200 parts of an aliphatic solvent of boiling range 110°–135° C. To one of these solutions was added 5 parts of copolymer (A). The solutions thus obtained were coated on to parchment paper, cured, laminated and tested in the manner described in Example 1. The results obtained are given below:

| Parts Copolymer added | Peel force (g/inch) at stripping speeds (inches/minute) | | | |
|---|---|---|---|---|
| | 12 | 400 | 800 | 1500 |
| 0 | 34 | 104 | 177 | 231 |
| 5 | 11 | 57 | 104 | 146 |

EXAMPLE 4

Three coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (B) of average formula:

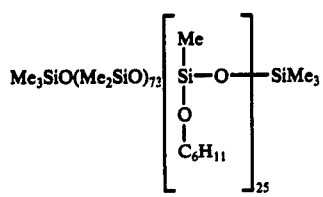

($C_6H_{11}$ is a cyclohexyl group
and to another was added 5 parts of a copolymer (C) of average formula:

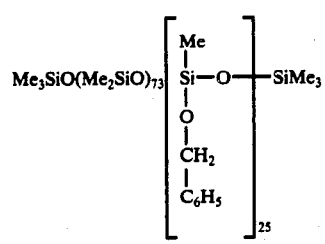

The three solutions thus obtained were coated and tested in the manner described in Example 1. The results obtained are given below:

EXAMPLE 5

Six coating solutions were prepared each consisting of 100 parts of a hydroxyl-ended dimethylpolysiloxane of viscosity as indicated below, 6 parts of the methylhydrogen polysiloxane used in Example 1, 7 parts of dibutyltin diacetate and 7 parts of the aminoalkoxypolysiloxane used in Example 2 in 1200 parts of toluene. To three of these solutions were added 5 parts of copolymer (A). The solutions thus obtained were coated and tested in the manner described in Example 1. The results obtained are given below:

| Parts copolymer | Hydroxyl-ended dimethylpolysiloxane viscosity (cP) at 25° C | Peel force (g/inch) at stripping speeds (inches/minute) | | | |
|---|---|---|---|---|---|
| | | 12 | 400 | 800 | 1500 |
| 0 | $57 \times 10^6$ | 22 | 94 | 155 | 205 |
| 5 | $57 \times 10^6$ | 7 | 53 | 67 | 127 |
| 0 | $29 \times 10^6$ | 20 | 72 | 111 | 165 |
| 5 | $29 \times 10^6$ | 7 | 44 | 64 | 96 |
| 0 | $0.93 \times 10^6$ | 39 | 129 | 170 | 194 |
| 5 | $0.93 \times 10^6$ | 9 | 65 | 92 | 105 |

EXAMPLE 6

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (D) of average formula:

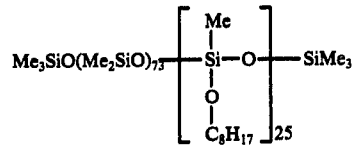

The solutions thus obtained were coated on to parchment paper, cured, laminated and tested in the manner described in Example 1. The results obtained are given below:

| Parts Copolymer added | Peel force (g/inch) at stripping speeds (inches/minute) | | | |
|---|---|---|---|---|
| | 12 | 400 | 800 | 1500 |
| 0 | 35 | 157 | 197 | 217 |
| 5 | 10 | 89 | 152 | 167 |

EXAMPLE 7

Two coating solutions were prepared each consisting of 100 parts of the hydroxyl-ended dimethylpolysiloxane used in Example 1, 6 parts of the methylhydrogen polysiloxane used in Example 1, 8 parts of dibutyltin diacetate, 1 part of acetic acid and 0.5 part of an aminoalkoxypolysiloxane of average formula:

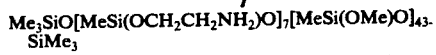
in 1200 parts of toluene.

To one of these solutions was added 5 parts of copolymer (A). These solutions were then coated on to vegetable parchment paper to give silicone coatings of about 0.8g./sq.meter and the coatings cured in a forced draught air oven at 120° C for 10 seconds. The cured silicone films were then coated with a solvent solution of the aggressive pressure sensitive adhesive used in Example 1. The papers thus obtained were then dried, laminated, stored and tested in the manner described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 18 | 107 | 210 | 305 |
| 5 | 10 | 77 | 150 | 257 |

EXAMPLE 8

Two coating solutions were prepared each consisting of 100 parts of the hydroxyl-ended dimethylpolysiloxane used in Example 1, 6 parts of the methylhydrogen polysiloxane used in Example 1, 1.1 parts of dibutyltin di(2-ethylhexoate), 0.8 part of tetra(2-methoxyethoxy)silane and 200 parts of methyl ethyl ketone in 1000 parts of toluene.

To one of these solutions was added 5 parts of copolymer (A). The solutions thus obtained were coated, cured, laminated and tested in the manner described in Example 7. The results obtained are given below:

| Parts copolymer added | Peel force (g/inch) at stripping speeds (inches/minute) | | | |
|---|---|---|---|---|
| | 12 | 400 | 800 | 1500 |
| 0 | 13 | 72 | 151 | 277 |
| 5 | 11 | 65 | 142 | 236 |

EXAMPLE 9

Two coating solutions were prepared each consisting of 100 parts of the hydroxyl-ended dimethylpolysiloxane used in Example 1, 6 parts of the methylhydrogen polysiloxane used in Example 1, 1.1 parts of 1,3-diacetyl-1,1,3,3-tetrabutyldistannoxane, 0.8 part of tetra(2-methoxyethoxy)silane and 200 parts of methyl ethyl ketone in 1000 parts of toluene.

To one of these solutions was added 5 parts of copolymer (A). The solutions thus obtained were coated, cured, laminated and tested in the manner described in Example 7. The results obtained are given below:

| Parts copolymer added | Peel force (g/inch) at stripping speeds (inches/minute) | | | |
|---|---|---|---|---|
| | 12 | 400 | 800 | 1500 |
| 0 | 14 | 84 | 170 | 272 |
| 5 | 10 | 59 | 131 | 235 |

EXAMPLE 10

Two coating solutions were prepared each consisting of 100 parts of the hydroxyl-ended dimethylpolysiloxane used in Example 1, 6 parts of the methylhydrogen polysiloxane used in Example 1, 3 parts of tetrabutyl bis(butyraldoximo)distannoxane, 3.6 parts of acetic acid and 0.6 part of tetra(2-methoxyethoxy)silane in 1200 parts of toluene.

To one of these solutions was added 5 parts of copolymer (A). The solutions thus obtained were coated, cured, laminated and tested in the manner described in Example 7. The results obtained are given below:

| Parts copolymer added | Peel force (g/inch) at stripping speeds (inches/minute) | | |
|---|---|---|---|
| | 12 | 400 | 800 |
| 0 | 16 | 82 | 190 |
| 5 | 10 | 66 | 137 |

EXAMPLE 11

Two coating solutions were prepared each consisting of 100 parts of the hydroxyl-ended dimethylpolysiloxane used in Example 1, 6 parts of the methylhydrogen polysiloxane used in Example 1, 3 parts of dibutyl bis(benzaldoximo)stannane, 3.6 parts of acetic acid and 0.6 part of tetra(2-methoxyethoxy)silane in 1200 parts of toluene.

To one of these solutions was added 5 parts of copolymer (D). The solutions thus obtained were coated, cured, laminated and tested in the manner described in Example 7. The results obtained are given below:

| Parts copolymer added | Peel force (g/inch) at stripping speeds (inches/minute) | | | |
|---|---|---|---|---|
| | 12 | 400 | 800 | 1500 |
| 0 | 16 | 70 | 136 | 225 |
| 5 | 12 | 54 | 94 | 131 |

EXAMPLE 12

Two coating solutions were prepared each consisting of 100 parts of the hydroxyl-ended dimethylpolysiloxane used in Example 1, 6 parts of the methylhydrogen polysiloxane used in Example 1, 1.1 parts of dibutyltin diethoxide, 0.8 part of tetra(2-methoxyethoxy)silane and 200 parts of methyl ethyl ketone in 1000 parts of toluene.

To one of these solutions was added 5 parts of copolymer (D). The solutions thus obtained were coated, cured, laminated and tested in the manner described in Example 7. The results obtained are given below:

| Parts copolymer | Peel force (g/inch) at stripping speeds (inches/minute) | | | |
|---|---|---|---|---|
| | 12 | 400 | 800 | 1500 |
| 0 | 17 | 75 | 122 | 240 |
| 5 | 11 | 47 | 81 | 139 |

EXAMPLE 13

Six coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To five of these solutions were added various amounts, as detailed below, of copolymer (A). The solutions thus obtained were coated, cured, laminated and tested in the manner described in Example 1. The results obtained are given below.

| Parts copolymer added | Peel force (g/inch) at stripping speeds (inches/minute) | | | |
|---|---|---|---|---|
| | 12 | 400 | 800 | 1500 |
| 0 | 37 | 119 | 165 | 204 |
| 0.5 | 31 | 110 | 145 | 181 |
| 1 | 25 | 104 | 139 | 170 |
| 2.5 | 18 | 86 | 115 | 147 |
| 10 | 12 | 71 | 110 | 142 |
| 50 | 24 | 107 | 150 | 165 |

EXAMPLE 14

Four coating solutions were prepared each consisting of 100 parts of a hydroxyl-ended dimethylpolysiloxane of viscosity as indicated below, 6 parts of the methylhydrogen polysiloxane used in Example 1, 8 parts of dibutyltin diacetate, 1 part of acetic acid and 0.5 part of the aminoalkoxypolysiloxane used in Example 7 in amounts of toluene as shown.

To two of these solutions were added 5 parts of copolymer (A). The solutions thus obtained were coated, cured, laminated and tested in the manner described in Example 7. The results obtained are given below.

| Parts copolymer added | Hydroxyl-ended dimethylpolysiloxane viscosity (cP) at 25° C | Parts toluene per 100 parts dimethylpolysiloxane | Peel force (g/inch) at stripping speeds (inches/minute) | | | |
|---|---|---|---|---|---|---|
| | | | 12 | 400 | 800 | 1500 |
| 0 | 96,800 | 400 | 54 | 152 | 210 | 275 |
| 5 | 96,800 | 400 | 17 | 84 | 119 | 151 |
| 0 | 2,520 | 200 | 56 | 142 | 167 | 206 |
| 5 | 2,520 | 200 | 14 | 77 | 102 | 130 |

EXAMPLE 15

Eight coating solutions were prepared each consisting of 100 parts of the hydroxyl-ended dimethylpolysiloxane used in Example 1, various amounts, as detailed below, of the methylhydrogen polysiloxane used in Example 1, 7 parts of dibutyltin diacetate and 7 parts of the aminoalkoxypolysiloxane used in Example 2 in 1200 parts of toluene.

To four of these solutions were added 5 parts of copolymer (A). The solutions thus obtained were coated, cured, laminated and tested in the manner described in Example 1. The results obtained are given below:

| Parts copolymer added | Parts of MeH polysiloxane | Peel force (g/inch) at stripping speeds (inches/minute) | | | |
|---|---|---|---|---|---|
| | | 12 | 400 | 800 | 1500 |
| 0 | 2 | 320 | — | — | — |
| 5 | 2 | 241 | — | — | — |
| 0 | 6 | 32 | 132 | 147 | 205 |
| 5 | 6 | 10 | 72 | 90 | 133 |
| 0 | 12 | 17 | 97 | 137 | 185 |
| 5 | 12 | 9 | 60 | 89 | 154 |
| 0 | 20 | 21 | 135 | 141 | 230 |
| 5 | 20 | 6 | 61 | 101 | 151 |

EXAMPLE 16

Two coating solutions were prepared each consisting of 100 parts of the hydroxyl-ended dimethylpolysiloxane used in Example 1, 12 parts of a methylhydrogen polysiloxane of average formula $Me_3SiO(Me_2SiO)_{48}(MeHSiO)_{50}SiMe_3$, 7 parts of dibutyltin diacetate and 7 parts of the aminoalkoxypolysiloxane used in Example 2 in 1200 parts of toluene.

To one of these solutions was added 5 parts of copolymer (A). The solutions thus obtained were coated, cured, laminated and tested as described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 16 | 81 | 141 | 212 |
| 5 | 7 | 41 | 73 | 137 |

EXAMPLE 17

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (E) of average formula:

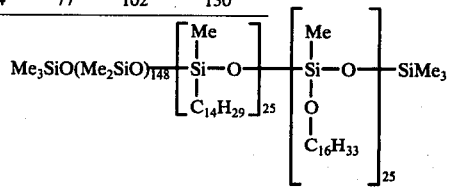

The solutions thus obtained were coated, cured, laminated and tested in the manner described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 29 | 114 | 141 | 197 |
| 5 | 10 | 60 | 101 | 150 |

EXAMPLE 18

Three coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To two of these solutions were added amounts, as detailed below, of a copolymer (F) of average formula:

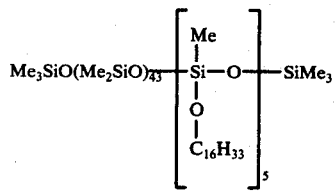

The solutions thus obtained were coated, cured, laminated and tested in the manner as described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 36 | 97 | 191 | 225 |
| 2.5 | 13 | 57 | 134 | 160 |
| 5 | 9 | 49 | 102 | 151 |

EXAMPLE 19

Three coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkylpolysiloxane used in Example 2 in 1200 parts of toluene.

To one of these solutions was added 5 parts of copolymer (G) of average formula:

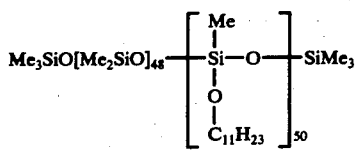

and to another was added 5 parts of copolymer (H) of average formula:

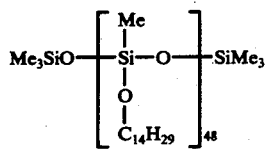

The solutions thus obtained were coated, cured, laminated and tested in the manner described in Example 1. The results obtained are given below:

| Copolymer added | Peel force (g/inch) at stripping speeds (inches/minute) | | | |
|---|---|---|---|---|
| | 12 | 400 | 800 | 1500 |
| — | 35 | 157 | 197 | 217 |
| G | 11 | 72 | 117 | 170 |
| H | 18 | 115 | 142 | 202 |

EXAMPLE 20

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of 3-aminopropyltriethoxysilane in 1200 parts of toluene.

To one of these solutions was added 5 parts of copolymer (G). The solutions thus obtained were coated, cured, laminated and tested in the manner described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 79 | 145 | 184 | 270 |
| 5 | 21 | 91 | 122 | 175 |

EXAMPLE 21

Two coating solutions were prepared each consisting of 80 parts of a linear trimethylsilyl-ended methylvinylpolysiloxane containing 0.2 mole % vinyl groups and of viscosity $2\times10^7$ cP at 25° C, 20 parts of a linear trimethylsilyl-ended methylvinylpolysiloxane containing 3.5 mole % vinyl groups and of viscosity 600,000 cP at 25° C, 6 parts of the methylhydrogen polysiloxane described in Example 1 and 0.05 part of bis(diethyl sulphide)platinous chloride in 1200 parts of an aliphatic solvent of boiling range 70°-95° C.

To one of these solutions was added 5 parts of copolymer (A). These solutions were then coated on to vegetable parchment paper to give silicone coatings of about 0.8g./sq.meter and the coatings cured in a forced draught air oven at 150° C for 20 seconds. The cured silicone films were then coated with a solvent solution of the aggressive pressure sensitive adhesive used in Example 1. The papers thus obtained were then dried, laminated, stored and tested in the manner described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 17 | 65 | 91 | 130 |
| 5 | 15 | 56 | 71 | 86 |

EXAMPLE 22

Two coating solutions were prepared each consisting of 100 parts of the hydroxyl-ended dimethylpolysiloxane used in Example 1, 7 parts of dibutyltin diacetate and 7 parts of the aminoalkylpolysiloxane used in Example 2 in 1200 parts of toluene.

To one of these solutions was added 5 parts of copolymer (A). The solutions thus obtained were coated, cured, laminated and tested in the manner described in Example 1. The results obtained are given below:

| Parts copolymer added | Peel force (g/inch) at stripping speeds (inches/minute) | | | |
|---|---|---|---|---|
| | 12 | 400 | 800 | 1500 |
| 0 | 121 | 167 | 267 | 280 |
| 5 | 85 | 145 | 215 | 250 |

EXAMPLE 23

Two coating solutions were prepared each consisting of 100 parts of the hydroxyl-ended dimethylpolysiloxane used in Example 1, 6 parts of the methylhydrogen polysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (I) of average formula:

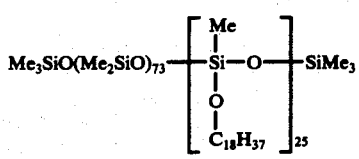

The solutions thus obtained were coated on to parchment paper, cured, laminated and tested in the manner described in Example 1. The results obtained are given below.

| Parts copolymer added | Peel force (g/inch) at stripping speeds (inches/minute) | | | |
|---|---|---|---|---|
| | 12 | 400 | 800 | 1500 |
| 0 | 48 | 121 | 189 | 206 |
| 5 | 22 | 81 | 117 | 145 |

EXAMPLE 24

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (J) of average formula:

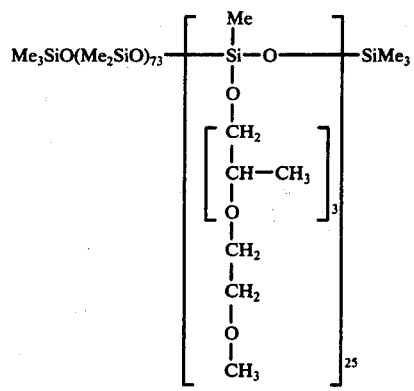

The solutions thus obtained were coated on to parchment paper, cured, laminated and tested in the manner described in Example 1. The results obtained are given below.

| Parts copolymer added | Peel force (g/inch) at stripping speeds (inches/minute) | | | |
|---|---|---|---|---|
| | 12 | 400 | 800 | 1500 |
| 0 | 38 | 130 | 190 | 260 |
| 5 | 21 | 90 | 130 | 199 |

EXAMPLE 25

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (K) of average formula:

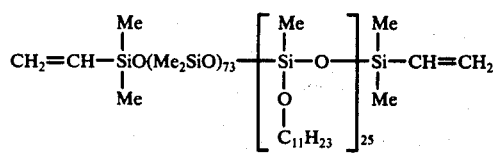

The solutions thus obtained were coated on to parchment paper, cured, laminated and tested in the manner described in Example 1. The results obtained are given below.

| Parts copolymer added | Peel force (g/inch) at stripping speeds (inches/minute) | | | |
|---|---|---|---|---|
| | 12 | 400 | 800 | 1500 |
| 0 | 35 | 120 | 144 | 206 |
| 5 | 13 | 75 | 115 | 155 |

EXAMPLE 26

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (L) of average formula:

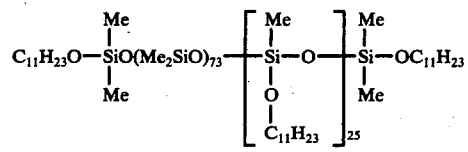

The solutions thus obtained were coated on to parchment paper, cured, laminated and tested as described in Example 1. The results obtained are given below.

| Parts copolymer added | Peel force (g/inch) at stripping speeds (inches/minute) | | | |
|---|---|---|---|---|
| | 12 | 400 | 800 | 1500 |
| 0 | 35 | 120 | 144 | 206 |
| 5 | 12 | 77 | 126 | 172 |

EXAMPLE 27

Two coating solutions were obtained each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of copolymer (M) of average formula:

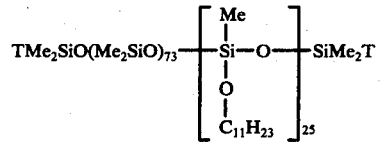

where T is a mixture of $-OC_2H_5$ and $-OC_{11}H_{23}$ groups.

The solutions thus obtained were coated on to parchment paper, cured, laminated and tested as described in Example 1. The results obtained are given below.

| Parts copolymer added | Peel force (g/inch) at stripping speeds (inches/minute) | | |
|---|---|---|---|
| | 12 | 400 | 1500 |
| 0 | 35 | 120 | 206 |
| 5 | 14 | 100 | 175 |

EXAMPLE 28

Two coatings were prepared each consisting of 100 parts of a linear hydroxyl-ended dimethylpolysiloxane of viscosity 70 cP at 25° C, 8 parts of the methylhydrogenpolysiloxane used in Example 1 and 0.03 part of bis(diethylsulphide)platinous chloride.

To one of these solutions was added 5 parts of copolymer (G). The solutions were then coated on to vegetable parchment paper and the coatings cured in a forced draught air oven at 120° C for 25 seconds. The cured silicone films were then coated with a solvent solution of the aggressive pressure sensitive adhesive used in Example 1. They were then dried, laminated, stored and tested as described in Example 1. The results obtained are given below.

| Parts copolymer added | Peel force (g/inch) at stripping speeds (inches/minute) | | | |
|---|---|---|---|---|
|  | 12 | 400 | 800 | 1500 |
| 0 | 5 | 23 | 29 | 35 |
| 5 | 2 | 10 | 22 | 26 |

EXAMPLE 29

Two coating solutions were prepared each consisting of 100 parts of a linear trimethylsilyl-ended methylvinylpolysiloxane containing 15 mole % vinyl groups and of viscosity 125 cS at 25° C, 8 parts of the methylhydrogenpolysiloxane used in Example 1 and 0.03 part of bis(diethylsulphide)platinous chloride.

To one of these solutions was added 5 parts of copolymer (G). The solutions thus obtained were coated, cured, laminated and tested in the manner described in Example 28. The results obtained are given below.

| Parts copolymer added | Peel force (g/inch) at stripping speeds (inches/minute) | | | |
|---|---|---|---|---|
|  | 12 | 400 | 800 | 1500 |
| 0 | 7 | 30 | 33 | 42 |
| 5 | 3 | 11 | 18 | 21 |

EXAMPLE 30

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (N) of average formula:

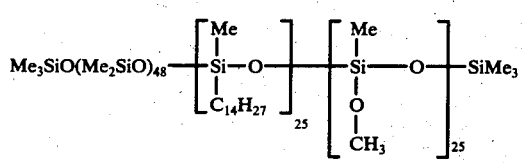

The solutions thus obtained were coated on to parchment paper, cured, laminated and tested in the manner described in Example 1. The results obtained are given below.

| Parts copolymer added | Peel force (g/inch) at stripping speeds (inches/minute) | | | |
|---|---|---|---|---|
|  | 12 | 400 | 800 | 1500 |
| 0 | 29 | 114 | 141 | 197 |
| 5 | 13 | 72 | 107 | 149 |

EXAMPLE 31

Two coating solutions were prepared each consisting of 100 parts of the hydroxyl-ended dimethylpolysiloxane used in Example 1, 6 parts of the methylhydrogenpolysiloxane used in Example 1, 7 parts of dibutyltin diacetate and 7 parts of the aminoalkoxypolysiloxane used in Example 2 in 1200 parts of toluene.

To one of these solutions was added 5 parts of a copolymer (P) of average formula:

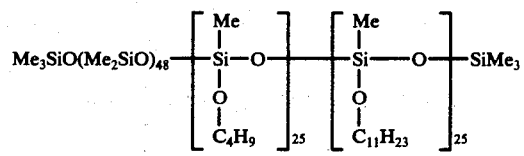

The solutions thus obtained were coated on to parchment paper, cured, laminated and tested in the manner described in Example 1. The results obtained are given below.

| Parts copolymer added | Peel force (g/inch) at stripping speeds (inches/minute) | | |
|---|---|---|---|
|  | 12 | 400 | 800 |
| 0 | 49 | 185 | 240 |
| 5 | 36 | 122 | 217 |

EXAMPLE 32

Two coating solutions were prepared each consisting of 100 parts of the hydroxyl-ended dimethylpolysiloxane used in Example 1, 6 parts of methylhydrogenpolysiloxane used in Example 1, 7 parts of dibutyltin diacetate and 7 parts of the aminoalkoxypolysiloxane used in Example 2 in 1200 parts of toluene. To one of these solutions was added 5 parts of copolymer (U) of average formula:

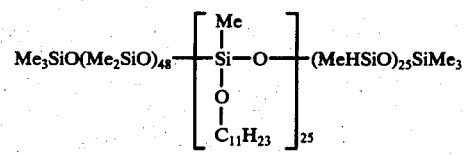

The solutions thus obtained were coated on to parchment paper, cured, laminated and tested in the manner described in Example 1. The results obtained are given below.

| Parts copolymer added | Peel force (g/inch) at stripping speeds (inches/minute) | | | |
|---|---|---|---|---|
|  | 12 | 400 | 800 | 1500 |
| 0 | 84 | 225 | 300 | 300 |
| 5 | 39 | 157 | 240 | 245 |

We claim:

1. An organopolysiloxane composition suitable for conferring release properties on substrates comprising 100 parts by weight of a linear diorganopolysiloxane in the form of a curable release composition and from 0.5 to 50 parts by weight based on the linear diorganopolysiloxane of a copolymer consisting essentially of the average general formula:

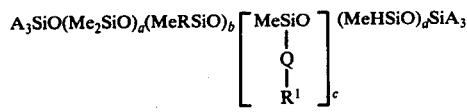

where A is selected from the group consisting of R, $R^1Q$, alkenyl and hydroxy groups and hydrogen, Q is oxygen or sulphur, R is selected from the group consisting of (a) alkyl, aryl, alkaryl, aralkyl and cycloalkyl groups, (b) groups —$R^2QR^3$ where $R^2$ is a divalent organic group having at least 2 carbon atoms and is joined to silicon by a C-Si linkage and $R^3$ is a monovalent hydrocarbon group and (c) hydrocarbonoxy groups joined to silicon by a C-Si linkage, $R^1$ is a hydrocarbon or hydrocarbonoxy group, $a$ and $d$, which will not normally be the same, are 0 or numbers not greater than 950, $b$ is 0 or a number not greater than 999 and $c$ is a number from 1 to 1000, $a + b + c + d$ is not less than 20 and not greater than 1000, $(b + c)/(a + b + c + d)$ is not less than 0.05, at least one of the groups R and $R^1$ being an alkyl group of 8 to 30 carbon atoms, the proportion of said copolymer in the composition being sufficient to provide at least one of said alkyl groups for each 2000 silicon atoms in the composition.

2. A composition according to claim 1 wherein the curable release composition comprises a linear polysiloxane containing silicon-bonded hydroxyl groups, a cross-linking agent selected from polysiloxanes containing silicon-bonded hydrogen, alkyl polysilicates, trialkoxyorganosilanes and partial hydrolysates thereof and organotriacyloxysilanes, and a curing catalyst.

3. A composition according to claim 1 wherein the curable release composition comprises a linear polysiloxane containing silicon-bonded vinyl groups, a polysiloxane containing silicon-bonded hydrogen and a platinum catalyst.

4. A composition according to claim 1 wherein the curable release composition comprises a linear polysiloxane containing silicon-bonded vinyl groups and a peroxide catalyst.

5. A composition according to claim 1 wherein the groups A are selected from the group consisting of methyl and vinyl groups and hydrogen.

6. A composition according to claim 1 wherein $(b + c)/(a + b + c + d)$ is from 0.1:1 to 0.9:1, $a/(a + b + c + d)$ is not less than 0.1:1, and $d/(a + b + c + d)$ is not greater than 0.3:1.

7. A composition according to claim 6 wherein $(b + c)/(a + b + c + d)$ is from 0.2:1 to 0.7:1, $a/(a + b + c + d)$ is not less than 0.3:1 and $d/(a + b + c + d)$ is not greater than 0.05:1.

8. A composition according to claim 1 wherein the copolymer is present in amount from 0.5 to 15 parts by weight per 100 parts by weight of the linear diorganopolysiloxane.

9. A composition according to claim 1 wherein at least some of the $R^1$ groups have at least 4 carbon atoms and wherein the copolymer is present in amount such that the ratio of $R^1$ groups having at least 4 carbon atoms to total silicon atoms present in the composition is not less than 1:1000.

10. Substrates obtained by coating thereon a composition as claimed in claim 1.